United States Patent [19]

Hoenl

[11] Patent Number: 4,771,107
[45] Date of Patent: Sep. 13, 1988

[54] THERMOPLASTIC MOLDING MATERIAL BASED ON ABS

[75] Inventor: Hans Hoenl, Obersuelzen, Fed. Rep. of Germany

[73] Assignee: BASF Aktiengesellschaft, Ludwigshafen, Fed. Rep. of Germany

[21] Appl. No.: 10,994

[22] Filed: Feb. 5, 1987

[30] Foreign Application Priority Data

Feb. 5, 1986 [DE] Fed. Rep. of Germany ....... 3603375

[51] Int. Cl.$^4$ ..................... C08L 55/02; C08F 279/04
[52] U.S. Cl. ...................... 525/86; 525/314; 525/315; 525/316
[58] Field of Search ................. 525/316, 86, 314, 315

[56] References Cited

U.S. PATENT DOCUMENTS 4,154,715 5/1979 Kruse .................... 260/33.6 AQ
4,221,883 9/1980 Mott et al. ................ 525/243
4,603,155 7/1986 Muramori et al. ............ 525/316

FOREIGN PATENT DOCUMENTS 1230507 5/1971 United Kingdom .

Primary Examiner—Carman J. Seccuro
Attorney, Agent, or Firm—Keil & Weinkauf

[57] ABSTRACT

A thermoplastic molding material which contains, in each case based on the molding material comprising A+B, A. from 50 to 95% by weight of a rigid matrix composed of,
 (a$_1$) styrene and
 (a$_2$) acrylonitrile,
B. from 50 to 5% by weight of a nonrigid phase which is uniformly dispersed in the rigid matrix and which comprises a graft copolymer of the monomers (a$_1$) and (a$_2$) and a styrene-butadiene block copolymer, wherein the styrene-butadiene block copolymer has a styrene content of from 50 to 95% by weight and a butadiene content of from 50 to 5% by weight, each based on the block polymer, and has a molecular weight (weight average) within the range from 50,000 to 300,000, is used for producing moldings.

4 Claims, 2 Drawing Sheets

THERMOPLASTIC MOLDING MATERIAL BASED ON ABS

The present invention relates to a thermoplastic molding material which is based on ABS and is composed of a rigid matrix comprising a styrene-acrylonitrile copolymer and a nonrigid phase comprising a graft copolymer. The graft copolymer is formed in the course of the preparation of the rigid matrix in the presence of a styrene- and butadiene-containing, anionically produced block copolymer.

The relevant prior art includes:
(1) U.S. Pat. No. 4,154,715
(2) British Patent No. 1,230,507 and
(3) U.S. Pat. No. 4,221,883.

Thermoplastic molding materials based on ABS can be prepared by various methods. In every case the result is a two-phase structure comprising a rigid matrix (S/AN copolymer) and, finely dispersed therein, a nonrigid phase in the form of a graft polymer (S/AN grafted onto polybutadiene). The nonrigid phase is always present in the form of discrete particles which vary in size. For instance, if ABS is prepared by the emulsion method, the size of the nonrigid phase particles can be set within the range from about 0.1 to 0.7 $\mu$m. The particle size range of the nonrigid phase for mass suspension or solution ABS can extend from 0.5 to 20 $\mu$m. The nonrigid phases of standard products generally have, in the case of solution ABS, an average particle size within the range from 1 to 5 $\mu$m.

All ABS products, whether prepared in an emulsion or mass suspension or solution process, are opaque, i.e. not even translucent.

Transparent molding materials which are only composed of styrene, AN and butadiene have hitherto not been disclosed. Only by equiparating the refractive indices of the rigid phase (S/AN) and of the nonrigid phase (in general PBu grafted with S/AN) by including methyl methacrylate in the rigid phase is it possible to obtain a transparent ABS (so-called AMBS).

It was therefore surprising to the skilled worker that transparent ABS based only on styrene, AN and butadiene would be obtainable in a simple manner, even in the light of the preparation of impact-resistant polystyrene. In particular, it was not foreseeable that the use of block copolymers having styrene contents of above 50% by weight [cf. (2), Example 2, use of styrene block copolymers with 30 or 40% by weight of styrene for ABS] would lead to a transparent product in which the nonrigid component is present not in the form of discrete particles but in the form of a lamelloid structure.

(3) describes, by way of example, mass polymerization processes for preparing ABS on the basis of styrenebutadiene block copolymers which contain 70% by weight of butadienes and 30% by weight of styrene. Even on the basis of (3) it was not foreseeable that by using styrene-butadiene block copolymers having styrene contents of more than 50% by weight it would be possible to obtain transparent ABS.

We have found that this object is achieved with a molding material as claimed in claim 1.

The present invention therefore relates to a thermoplastic molding material which contains, in each case based on the molding material comprising A+B,
A. from 50 to 95% by weight of a rigid matrix composed of, based on A,
 ($a_1$) from 98 to 50% by weight of styrene and
 ($a_2$) from 2 to 50% by weight of acrylonitrile,
B. from 50 to 5% by weight of a nonrigid phase which is uniformly dispersed in the rigid matrix and which comprises a graft copolymer of the monomers ($a_1$) and ($a_2$) and a styrene-butadiene block copolymer.

In the molding material, the styrene-butadiene block copolymer has a styrene content of from 50 to 95% by weight and a butadiene content of from 50 to 5% by weight, each based on the block polymer, and has a molecular weight (weight average) within the range from 50,000 to 400,000.

In what follows, the constitution of the molding material according to the invention, i.e. in particular the morphology of the molding material according to the invention and the preparation thereof, are described together with the requisite starting materials and assistants.

The molding material contains components A and B and preferably nothing else. To process the molding material, customary additives (component C) are incorporated.

COMPONENT A

The molding material according to the invention is composed of a rigid matrix comprising one or more copolymers of ($a_1$) styrene and ($a_2$) acrylonitrile. This rigid matrix accounts for from 50 to 95% by weight, preferably from 60 to 90% by weight, of the molding material composed of components A+B. A suitable monomer ($a_1$) for constructing the rigid matrix is in particular styrene. However, it is also possible to use alpha-methylstyrene or mixtures with styrene; preference is, however, given to the use of styrene only, so that the rigid matrix is preferably composed of poly(styrene-acrylonitrile). The rigid matrix can have viscosity numbers within the range from 50 to 100 ml/g (0.5% by weight in dimethylformamide), in particular within the range from 60 to 90 ml/g. This corresponds to average molecular weights ($M_w$) within the range from 70,000 to 170,000, in particular from 90,000 to 150,000. The preparation of copolymers of this type is familiar to those skilled in the art.

The composition of the rigid matrix can be varied within wide limits. The monomer constituent ($a_1$) can range from 98 to 50% by weight, preferably from 95 to 70% by weight, and in particular from 90 to 70% by weight ($a_2$), the remainder up to 100 being acrylonitrile in each case).

(It is to be noted that, on using styrene only, a different morphology of the nonrigid phase is obtained with formation of capsule particles.)

COMPONENT B

The molding material according to the invention features as component B a nonrigid phase which is present in the rigid matrix in the form of a fine dispersion. The nonrigid phase is present in the rigid matrix in an amount of from 5 to 50% by weight, preferably from 10 to 40% by weight. This nonrigid phase has a special structure. It comprises a lamelloid network which can be seen in electron micrographs of the end product, the molding material (cf. FIGS. 3 and 4). Presumably, the special properties of the molding material of the present invention are due to this morphology of the nonrigid phase. The nonrigid phase is a graft polymer of the monomers ($a_1$) and ($a_2$) of the rigid matrix, i.e. in particular of styrene and acrylonitrile which are grafted onto a styrene-butadiene block copolymer.

It is an essential feature that the styrene-butadiene block copolymer contains more than 50% by weight of styrene and has a styrene content of from 50 to 95% by weight, preferably from 55 to 90% by weight, and in particular from 60 to 85% by weight, in each case based on the block copolymer (the other constituent being in each case butadiene, $\Sigma = 100\%$).

For the purposes of the present invention, a styrene-butadiene block copolymer is one orepared by anionic polymerization with the aid of lithium initiators. In the block copolymer, the polybutadiene block has the customary medium-cis structure, which can be modified by adding polar solvents. The preparation of styrene-butadiene block copolymers of this type is known to those skilled in the art.

The styrene-butadiene block copolymer may have a well-defined or an ill-defined transition. It may have a linear or a radial structure, even a linear coupled product being usable. Preferably, of the abovementioned possible structures of the block copolymer preference is given to styrene-butadiene 2-block copolymers of the abovementioned composition. Particular preference is therefore given to linear coupled and uncoupled styrene-butadiene 4- or 2-block copolymers with a well or ill-defined transition and the radial styrene-butadiene block copolymers obtainable from such products by means of more than bifunctional couoling agents, in particular to those with 2-block copolymers in the branches. The molecular weights of the styrene-butadiene block copolymers can be within the range from 50,000 to 400,000, in particular within the range from 70,000 to 200,000.

COMPONENT C

In addition to components A and B, the molding material according to the invention may contain from 1 to 40 parts by weight, preferably from 1 to 20 parts by weight, of a component C per 100 parts by weight of A and B. This component C can be added to the reaction batch before or during the preparation of the molding material, or be mixed into the molding material for processing.

For the purposes of the present invention, component C subsumes for example the assistants known for the preparation of the molding material of the present invention, such as mineral oils, conventional esters of aromatic or aliphatic carboxylic acids with aliphatic alcohols, polyalkylene oxides based on ethylene oxide and/or propylene oxide, molecular weight regulants, protective colloids, antioxidants, etc. Assistants further include lubricants, such as zinc stearate and other stearates, and other customary assistants for producing moldings from the molding material, namely dyes, antioxidants, stabilizers or possibly flameproofing agents in the amounts customary to those skilled in the art.

Preparation of the molding material according to the invention

The preparation is effected by polymerization of the monomers ($a_1$) and ($a_2$) which comprise the rigid matrix, i.e. in particular of styrene and acrylonitrile, in the presence of a styrene-butadiene block copolymer. This polymerization can be carried out using the customary initiators or purely thermally or in a combined thermal/free radical process. The polymerization can be carried out continuously or batchwise. In the case of the batchwise method, a two-stage process is preferred, the first stage being carried out in a conventional manner in the presence or absence of a solvent, and the second stage in suspension. Processes for continuous practice and batchwise practice are described in sufficient detail in German Published Applications DAS No. 1,770,392 and DAS No. 2,613,352 respectively.

In the batchwise process, where the first stage is carried out in the presence or absence of a solvent, shearing forces are applied (by stirring) to bring about the required morphology of the nonrigid phase (rubber morphology). The temperatures in the first stage lie within the range from 50° C. to 200° C. In the subsequent second stage, which is preferably carried out in suspension, the reaction batch has added to it water and a customary water-soluble suspending agent, in particular methylcellulose, hydroxypropylcellulose, polyvinyl alcohol, polyvinylpyrrolidone etc.

In the graft copolymerization of the monomers which form the eventual rigid matrix, which is carried out in the presence of the styrene-butadiene block copolymer, first the monomers are polymerized in the presence or absence of a solvent. In the course of the polymerization, the monomers which form the rigid matrix are grafted onto the block rubber.

It is known to those skilled in the art that, depending on the process, the polymerization can lead to different conversions and/or solids contents. To obtain optimal products, the conversions required in the individual reactors and hence also the solids content will have to be determined by means of a few experiments.

The parameters described in the Examples and Comparative Experiments were determined as follows:
1. Vicat temperature in ° C. by DIN 53,460
2. Tensile stress in $N/mm^2$ by DIN 53,455, with 5 mm/min takeoff speed
3. Breaking strength in $N/mm^2$ by DIN 53,455, with 5 mm/min takeoff speed
4. Elongation at break in % by DIN 53,455, with 5 mm/min takeoff speed
5. Notched impact strength in $kJ/m^2$ by DIN 53,453 at 23° C.
6. Transparency: visually on molded platelets of 1 mm thickness The invention is further illustrated hereinafter by means of two Examples and three Comparative Experiments, where the parts and percentages are by weight.

EXAMPLES 1 AND 2: COMPARATIVE EXPERIMENTS $C_1$ to $C_3$

In each of the Examples and Comparative Experiments a batchwise mass suspension polymerization was carried out in a 5 l capacity Juvo kettle. The heat of reaction was removed by jacket cooling. The temperature in the interior was regulated. The first stage was carried out with a filling ratio of 40% and the subsequent second and hence final stage was completed in suspension with a filling ratio of 80%. The polymerization was carried out under isothermal conditions, namely at 110°–120° C. in the absence of dibenzoyl peroxide (BPO) and at 75°–80° C. in the presence of 0.18 part of BPO. In all cases, tertiary dodecylmercaptan (TDM) was present as a regulant.

In this stage of the process the speed of the horseshoe stirrer was 200 r.p.m. The first stage was continued to a conversion of 35%. The composition of the starting solution (reaction batch) is given in the Table. In Comparative Experiment C1, a homopolybutadiene ($M_w \sim 180,000$) having a medium-cis structure ($\sim 35\%$ of 1,4-cis, ~55% of 1,4-trans and about 10% of 1,2-vinyl) was used. Comparative Experiments C2 and C3 and Examples 1 and 2 were carried out using linear styrene-butadiene 2-block copolymers with a well-defined transition (C2 and C3: ratio styrene:butadiene 40:60, $M_w$ about 210,000; $E_1$ and $E_2$: styrene:butadiene 70:30, $M_w$ about 180,000) and medium-cis-PBu blocks. The polybutadiene content was the same in all batches. To this mixture was also added 0.12 part of a sterically hindered phenol (®Irganox 1076).

After the stated conversion figure of 35% had been reached, 1.10 parts of dicumyl peroxide were added to the reaction mixture, followed by 1800 parts of water, based on 2000 parts of the reaction batch from the mass polymerization, and 18 parts of a protective colloid based on polyvinylpyrrolidone (®Luviskol K 90) as well as 1.8 parts of sodium phosphate as stabilizers.

In the suspension stage, the mixture was polymerized at 110° C. for 3 hours, at 130° C. for a further 3 hours and finally at 140° C. for 4 hours. The bead polymer obtained was filtered off and dried. Samples were taken of the resulting products to prepare molded platelets for electron micrographs and test specimens for the mechanical tests. The results are shown in the Table.

TABLE

Properties of the molding materials of Examples ($E_n$) and Comparative Experiments ($C_n$)

| Experiment/Example | C1 | C2 | C3 | E1 | E2 |
|---|---|---|---|---|---|
| Parts of styrene | 67.3 | 63.4 | 63.4 | 53.5 | 53.5 |
| Parts of AN | 22.5 | 21.1 | 21.1 | 17.8 | 17.8 |
| Parts of SB block rubber | 0 | 13.2 | 13.2 | 26.4 | 26.4 |
| Parts of polybutadiene | 7.9 | 0 | 0 | 0 | 0 |
| Parts of TDM | 0.20 | 0.20 | 0.18 | 0.20 | 0.18 |
| Parts of BPO | 0 | 0 | 0.15 | 0 | 0.15 |
| % by weight of styrene bonded in SB block rubber | — | 40 | 40 | 70 | 70 |
| Polymerization temperature (°C.) | 115 | 113 | 76 | 120 | 79 |
| Vicat temperature (°C.) | 97.0 | 98.0 | 97.0 | 88.0 | 86.0 |
| Tensile stress (N/mm$^2$) | 28.3 | 39.9 | 39.5 | 27.2 | 28.2 |
| Breaking strength (N/mm$^2$) | 28.3 | 39.4 | 34.1 | 27.1 | 26.5 |
| Elongation at break (%) | 20 | 5 | 5 | 3 | 3 |
| Notched impact strength (kJ/m$^2$) | 8.1 | 12.3 | 16.7 | 6.0 | 10.5 |
| Transparency | — | — | — | + | + |

Figure 1:
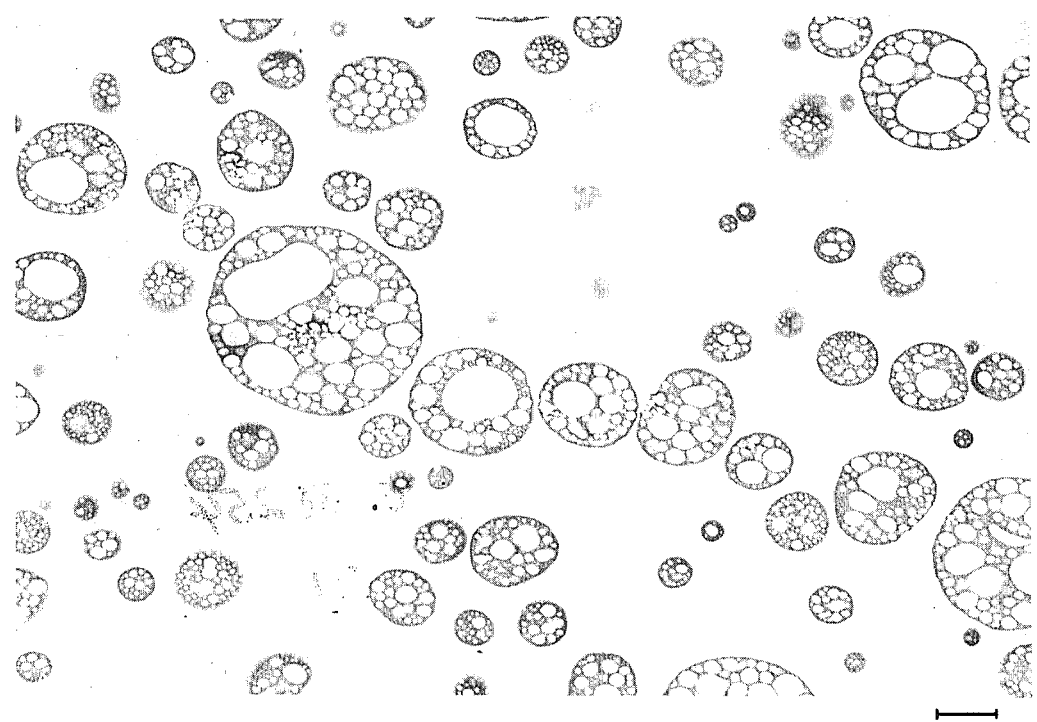
FIGS. 1 to 4
Figure 2:
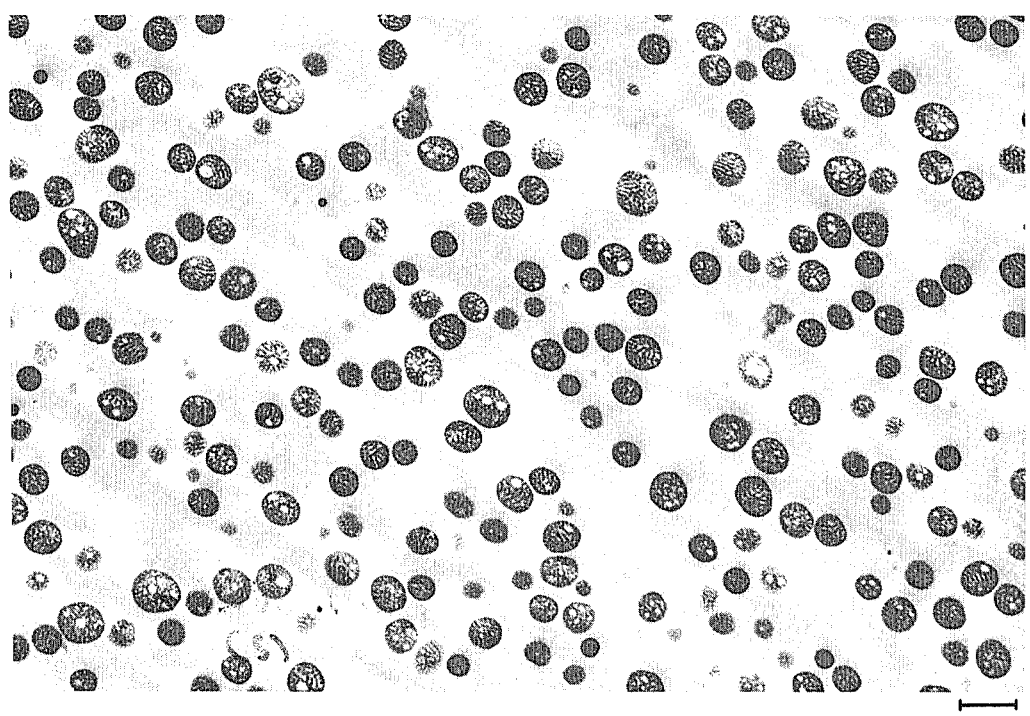
Figure 3:
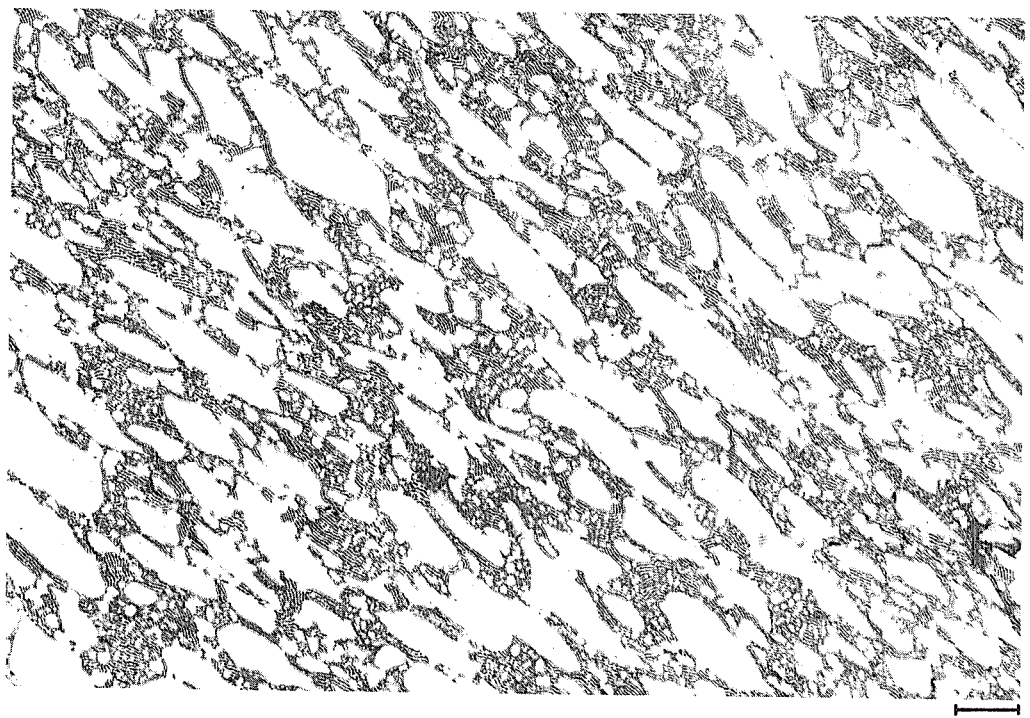
Figure 4:
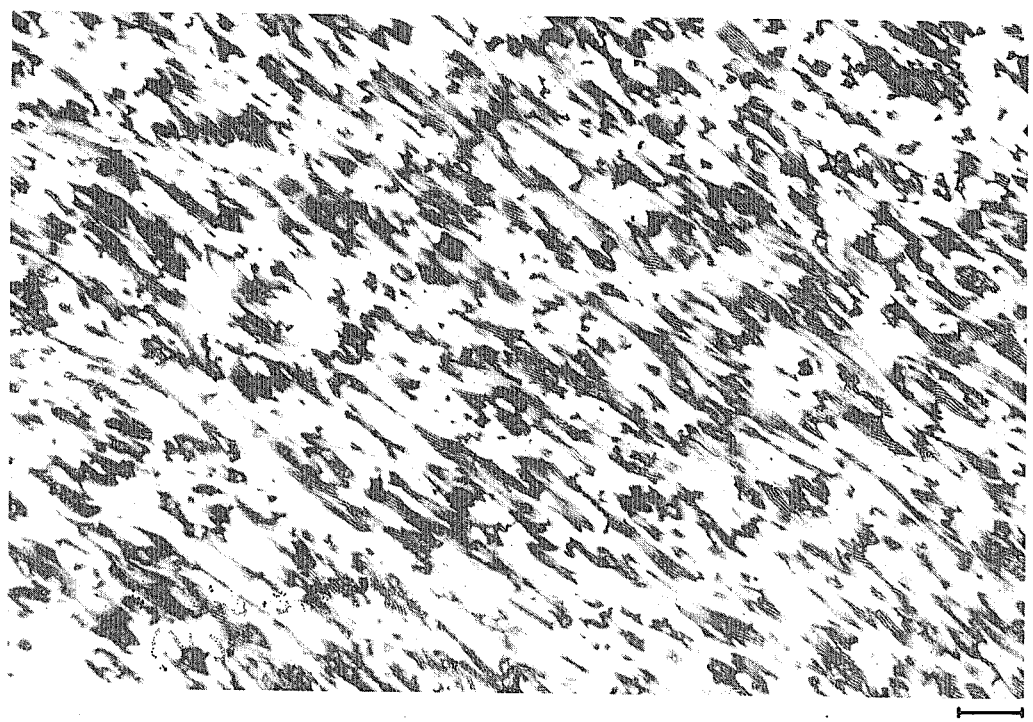

Electron micrographs of thin sections of molding materials from
Experiment 1 ≙ FIG. 1
Experiment 2 ≙ FIG. 2
Example 1 ≙ FIG. 3
Example 2 ≙ FIG. 4
(Magnification 10,000×, so that 1 cm in the micrograph corresponds to 1 μm)

I claim:

1. A transparent thermoplastic molding material which contains, in each case based on the molding material comprising A+B,
A. from 50 to 95% by weight of a rigid matrix composed of, based on A,
   ($a_1$) from 98 to 50% by weight of styrene and
   ($a_2$) from 2 to 50% by weight of acrylonitrile,
B. from 50 to 5% by weight of a nonrigid phase which is uniformly dispersed in the rigid matrix and which comprises a graft copolymer of the monomers ($a_1$) and ($a_2$) and a styrene-butadiene block copolymer,
wherein the styrene-butadiene block copolymer has a styrene content of from greater than 50 to 95% by weight and a butadiene content of from less than 50 to 5% by weight, each based on the block polymer, and has a molecular weight (weight average) within the range from 50,000 to 300,000.

2. A transparent thermoplastic molding material which contains, in each case based on the molding material comprising A+B,
A. from 60 to 90% by weight of a rigid matrix composed of, based on A,
   ($a_1$) from 95 to 70% by weight of styrene and
   ($a_2$) from 5 to 30% by weight of acrylonitrile,
B. from 40 to 10% by weight of a nonrigid phase which is uniformly dispersed in the rigid matrix and which comprises a graft copolymer of the monomers ($a_1$) and ($a_2$) and a styrene-butadiene block copolymer,
wherein the styrene-butadiene block copolymer has a styrene content of from 55 to 90% by weight and a butadiene content of from 45 to 10% by weight, each based on the block polymer, and has a molecular weight (weight average) within the range from 50,000 to 400,000.

3. A transparent thermoplastic molding material which contains, in each case based on the molding materia rising A+B,
A. from 60 to 90% by weight of a rigid matrix composed of, based on A,
   ($a_1$) from 90 to 70% by weight of styrene and
   ($a_2$) from 10 to 30% by weight of acrylonitrile,
B. from 40 to 10% by weight of a nonrigid phase which is uniformly dispersed in the rigid matrix and which comprises a graft copolymer of the monomers ($a_1$) and ($a_2$) and a styrene-butadiene block copolymer,
wherein the styrene-butadiene block copolymer has a styrene content of from 60 to 85% by weight and a butadiene content of from 40 to 15% by weight, each based on the block polymer, and has a molecular weight (weight average) within the range from 50,000 to 400,000.

4. A transparent thermoplastic molding material which contains, in each case based on the molding material comprising A+B,
A. from 60 to 90% by weight of a rigid matrix composed of, based on A,
   ($a_1$) from 85 to 70% by weight of styrene and
   ($a_2$) from 15 to 30% by weight of acrylonitrile,
B. from 40 to 10% by weight of a nonrigid phase which is uniformly dispersed in the rigid matrix and which comprises a graft copolymer of the monomers ($a_1$) and ($a_2$) and a linear styrene-butadiene block copolymer with a well-defined transition,
wherein the styrene-butadiene block copolymer has a styrene content of from 60 to 85% by weight and a butadiene content of from 40 to 15% by weight, each based on the block polymer, and has a molecular weight (weight average) within the range from 50,000 to 400,000.

* * * * *